(12) United States Patent
Maderebner

(10) Patent No.: US 11,674,300 B2
(45) Date of Patent: Jun. 13, 2023

(54) CONNECTING DEVICE FOR MOUNTING A WOODEN CONSTRUCTION ELEMENT

(71) Applicant: Universitat Innsbruck, Innsbruck (AT)

(72) Inventor: Roland Maderebner, Innsbruck (AT)

(73) Assignee: Universitat Innsbruck, Innsbruck (AT)

( * ) Notice: Subject to any disclaimer, the term of this patent is extended or adjusted under 35 U.S.C. 154(b) by 1349 days.

(21) Appl. No.: 15/780,746

(22) PCT Filed: Dec. 2, 2016

(86) PCT No.: PCT/EP2016/079597
§ 371 (c)(1),
(2) Date: Jun. 1, 2018

(87) PCT Pub. No.: WO2017/093490
PCT Pub. Date: Jun. 8, 2017

(65) Prior Publication Data
US 2018/0371741 A1 Dec. 27, 2018

(30) Foreign Application Priority Data

Dec. 2, 2015 (DE) .......................... 102015224116.5

(51) Int. Cl.
*E04B 1/26* (2006.01)
*E04B 1/343* (2006.01)
(Continued)

(52) U.S. Cl.
CPC .......... *E04B 1/2604* (2013.01); *E04B 1/3416* (2013.01); *E04B 1/34357* (2013.01);
(Continued)

(58) Field of Classification Search
CPC .... E04B 1/2608; E04B 1/2604; E04B 1/3416; E04B 1/34357; E04B 5/12; E04B 5/43;
(Continued)

(56) References Cited

U.S. PATENT DOCUMENTS

| 469,638 A | * | 2/1892 | Chase | ....................... E04B 1/24 52/261 |
| 922,329 A | * | 5/1909 | Porter | .................. B65D 88/742 454/175 |

(Continued)

FOREIGN PATENT DOCUMENTS

| AT | 506192 A1 | 7/2009 |
| AT | 514284 A1 | 11/2014 |

(Continued)

OTHER PUBLICATIONS

International Preliminary Report on Patentability dated Jun. 14, 2018, for International Application No. PCT/EP2016/079597, 7 pages.

(Continued)

*Primary Examiner* — Brent W Herring
(74) *Attorney, Agent, or Firm* — Frost Brown Todd LLP

(57) ABSTRACT

The invention relates to a connecting device (3) for mounting a wooden construction element (1), in particular in the form of a panel or beam, on a support (2a), wherein the connecting device (3) has a mounting node (4), which is designed for mounting the connecting device (3) on the support (2a), and a coupling arrangement (5), which is connected to the mounting node (4) and which, in the installed state, while projecting from the mounting node (4) on an upper side (1a) of the wooden construction element (1) can be connected to the latter by fastening members (7), which at least partially pass through the wooden construction element (1), wherein the mounting node (4) and the coupling arrangement (5) are each produced from a material which has a higher strength than that of the wooden construction element (1). The invention further relates to a wooden construction arrangement having a connecting (Continued)

device (3) according to the invention and to a structure having such a wooden construction arrangement.

24 Claims, 8 Drawing Sheets

(51) Int. Cl.
| | |
|---|---|
| *E04B 5/12* | (2006.01) |
| *E04B 1/34* | (2006.01) |
| *E04B 5/43* | (2006.01) |
| *F16B 25/00* | (2006.01) |
| *F16B 7/18* | (2006.01) |
| *F16B 43/00* | (2006.01) |

(52) U.S. Cl.
CPC .............. *E04B 5/12* (2013.01); *E04B 5/43* (2013.01); *E04B 1/2608* (2013.01); *E04B 2001/2616* (2013.01); *E04B 2001/2644* (2013.01); *E04B 2001/2652* (2013.01); *E04B 2001/2676* (2013.01); *E04B 2001/2684* (2013.01); *F16B 7/185* (2013.01); *F16B 25/0015* (2013.01); *F16B 43/00* (2013.01)

(58) Field of Classification Search
CPC ..... E04B 2001/2616; E04B 2001/2644; E04B 2001/2652; E04B 2001/2676; E04B 2001/2684; F16B 7/185; F16B 25/0015; F16B 43/00
USPC ........... 52/82, 260, 842, 715, 634, 636, 696; 248/155.2, 155.3
See application file for complete search history.

(56) References Cited

U.S. PATENT DOCUMENTS

| | | | | |
|---|---|---|---|---|
| 1,148,320 A | * | 7/1915 | Hollis | E04B 7/028 52/82 |
| 1,460,098 A | * | 6/1923 | Houser | A01F 25/10 52/465 |
| 1,915,630 A | * | 6/1933 | Tichenor | F16B 39/22 411/968 |
| 2,282,756 A | * | 5/1942 | Curran | E04H 6/44 52/73 |
| 2,587,353 A | * | 2/1952 | Marschak | E04B 1/346 414/233 |
| 3,633,325 A | * | 1/1972 | Bartoli | E04B 1/3412 52/246 |
| 4,194,851 A | * | 3/1980 | Littlefield | E04B 1/3211 52/81.3 |
| 4,265,059 A | * | 5/1981 | Johnson | E04H 12/182 D25/16 |
| 4,384,801 A | * | 5/1983 | Hamel | E04B 1/1903 52/81.3 |
| 4,521,998 A | * | 6/1985 | DeLorme | E04B 1/1903 52/81.3 |
| 4,663,898 A | * | 5/1987 | Yacaboni | E02D 27/42 D25/19 |
| 5,042,217 A | | 8/1991 | Bugbee et al. | |
| 5,197,241 A | * | 3/1993 | Romeo | E04H 1/1205 52/63 |
| 6,843,026 B2 | * | 1/2005 | Hoehn | E04B 7/028 52/693 |
| 7,603,816 B1 | * | 10/2009 | Hohmann, Jr. | E04B 1/2604 43/132.1 |
| 8,739,476 B1 | * | 6/2014 | Royer | E04B 7/028 52/93.2 |
| 2010/0088976 A1 | * | 4/2010 | Anderson | E04H 1/12 52/82 |
| 2020/0299955 A1 | * | 9/2020 | Ryan | E04B 2/707 |

FOREIGN PATENT DOCUMENTS

| | | | | |
|---|---|---|---|---|
| DE | 102009022161 A1 | | 12/2010 | |
| EP | 3269889 A1 | * | 1/2018 | ............ E02D 27/08 |
| GB | 2150998 A | | 7/1985 | |
| WO | WO 2001/025558 A1 | | 4/2001 | |
| WO | WO 2005/078202 A1 | | 8/2005 | |
| WO | WO 2014/012708 A1 | | 1/2014 | |

OTHER PUBLICATIONS

Natterer, Julius; Thomas Herzog; and Michael Volz. "Holzbau-Atlas." p. 157; 1996.

* cited by examiner

CONNECTING DEVICE FOR MOUNTING A WOODEN CONSTRUCTION ELEMENT

FIELD OF THE INVENTION

The present invention relates generally and more particularly to a connecting device for mounting a wooden construction element—in particular in the form of a panel or beam—on a support.

The invention also relates to a wooden construction arrangement having a connecting device according to the invention, with a support and a wooden construction element.

The invention also relates to a structure having such a wooden construction arrangement.

BACKGROUND OF THE INVENTION

Wood has been used for a long time to produce supporting frameworks, structures and buildings. In particular wooden construction elements in the form of beams (frames, rafters, beams, frameworks, roof structures) as well as also wooden construction elements in the form of panels (boards, planks, panels) have been used and are still used for tins purpose.

Modern wooden structures can consist of a plurality of different wooden construction products or wood-based materials. Typical wood-based materials are solid wood as well as materials consisting of a plurality of glued or adhered layers, such as cross laminated timber, plywood beams, plywood veneers and chip plywood as well as glued laminated wood, laminated wood beams, laminated wood veneers and chip laminated wood. Moreover, the most different wood-fiber materials are used.

In particular, the use of cross laminated timber (CLT) has strongly increased in the last few years, in which a plurality of board layers with cross-wise fiber direction are glued or adhered into panel elements.

Cross laminated timber elements (CLT elements) are used in buildings predominantly in the wall, ceiling and roof regions and, as disk- or panel-loaded members, absorb forces and loads transversely or longitudinally to the panel plane.

The manufacturing technology of CLT panels has developed tremendously in the last few years, and this is why CLT panels having lengths of up to about 15 m, widths of up to about 3.5 in and thicknesses of a few centimeters to about 35 cm and more are nowadays available. As a result, so called flat ceilings are increasingly used in woodwork—as have been used in concrete construction and steel construction for a long time already. These flat ceilings are ceiling constructions where the ceiling elements ace point-mounted on—preferably thin—supports without so called stringers (i.e. reinforcing beams on the underside). Persons skilled in the art of wood construction and also the below explanations consider point mounting to be the mounting on relatively small mounting areas—ranging from about 20 cm² to about 0.5 m²—compared to the dimensions of the construction elements to be mounted.

In such so called point mountings, high compressive stresses are created at the mounting points or mounting areas due to the concentrated load introduction. When particularly thin supports are used which are often preferred for architectural reasons, high local loads can thus occur, with which the compressive stresses admissible for the construction element to be mounted can be exceeded, which can lead to member failure, e.g. in the form of debossing, piercing, rolling shear failure and even fracture.

The load-bearing capacity of wood transverse to the fiber direction is only a fraction (about one tenth) of the load-bearing capacity in the fiber direction. In addition to the high load resulting from compressive forces transverse to the wood fiber direction, point loads with increased shear stresses occur at point mountings. Similar to the compressive stress, the capacity to withstand shear stresses is here influenced by the fiber direction and, transverse to the fiber direction (=rolling shear), is only about 30% of that parallel to the fiber direction. Since wooden construction elements, such as panels or beams, used for building floor or ceiling constructions, are predominantly exposed to compressive loads transverse to the fiber direction in the mounting area where they are point-mounted on supports, tins property of the material is here particularly important.

For a better distribution of force and/or pressure, e.g. enlarged bearing brackets can be used by designing e.g. the mounting on the support head "like a mushroom" so as to enlarge the mounting area (i.e. the load introduction area). However, this is in many cases disadvantageous or undesired for optical or constructional reasons.

Another known solution approach consists in screwing fully threaded screws into the wooden construction element in the mounting area. As a result, the transverse compressive strength of the wooden construction element can be increased because the additionally mounted fully threaded screws distribute the load to a larger volume in the wooden construction element. However, in the case of overload the screws can be forced into the wood-based material or also buckle.

A further known possibility for improving the compressive strength and the shear strength of the wooden construction element to be mounted is to not only screw screws into the wooden construction element in the mounting area but also provide it in the vicinity of the mounting area with obliquely fastened screws largely passing through the construction element. It is thus possible to form "inner" framework structures in the wood construction element that further increase the load-bearing capacity in the mounting area. However, the effect is limited to a relatively narrow area around the mounting area, is hard to quantify and can only be realized with a higher assembly effort.

Due to these insufficiencies in the prior art, the timber technology is mostly prevented to date from using point-mounted flat ceiling constructions with desirable column rasters of 5 m×5 in or more.

In the case of multi-story buildings, this is aggravated by the fact that the supports in lower stories not only have to carry the respective ceiling construction but also the weights of the stories there-above, as a result of which the lower story ceilings quickly reach their maximum loads at the mounting points of the supports.

SUMMARY OF THE INVENTION

The object of the present invention is to provide a connecting device of the above mentioned type, by means of which the above mentioned drawbacks can be at least partially eliminated, in particular by allowing the point-mounting of wooden construction elements on supports without additional stringers and/or without enlarged mounting areas so as to provide the timber construction with further possibilities.

According to the invention, this is achieved by the features of claim 1. Further aspects, advantages and improvements follow from the features of dependent claims 2 et seq.

According to a first aspect, the present invention provides a connecting device for mounting a wooden construction element, in particular in the form of a panel or beam, on a support, wherein the connecting device has
- a mounting node which is designed for mounting the connecting device on the support,
- and a coupling arrangement which is connected to the mounting node and, in the installed state, projects from the mounting node on an upper side of the wooden construction element, can be connected to the latter using fastening member which at least partially pass through the wooden construction element, wherein
- the mounting node and the coupling arrangement are both made from a material (e.g. metal, in particular steel) which has a higher strength than that of the wooden construction element.

In a connecting device of this design, the mounting node—made of a resilient material—is thus mounted on the support, and the coupling arrangement which is connected to the mounting node and projects along the upper side of the wooden construction element is designed in such a way that it can be connected to the wooden construction element to be mounted by fastening member or, in the installed state, is connected via its underside (i.e. after the installation of the fastening member) to the upper side of the wooden construction element. In other words, in the installed state, the wooden construction element is attached to the coupling apparatus in suspended fashion, and the support force introduced at the support head via the comparatively small mounting area is introduced into the wooden construction element via the markedly larger area of the projecting coupling; apparatus from above—i.e. as a tensile force. This explanation makes clear that the connecting apparatus according to the invention is advantageous compared to the direct point-mounting because the high support pressure resulting at the small mounting area only acts on the loadable coupling node and not on the wooden construction element. Only the support pressure correspondingly reduced as a result of the larger area of the coupling apparatus acts on the wooden construction element.

Another advantage of a thus designed connecting device is that it can be made in such a way that no further components are visible on the underside of the wooden construction element—other than the (thin) support. This is in particular desirable in modern flat ceiling designs.

Of course, the principle of the invention is not only limited to flat ceilings with CLT elements but all kinds of wooden construction elements, in particular wooden construction elements in the form of panels and beams, can advantageously be mounted by means of the connecting device according to the invention.

The invention provides that, in the installed state—in a top view when viewed in the direction of the support—the coupling arrangement projects from the support head area (i.e. the mounting area). Here, the coupling arrangement can be designed in a plurality of advantageous forms: from circular, star- or sprocket-shaped—e.g. in the form of preferably elongate members which, in the installed state, extend from the mounting node radially outwards and which are referred to below as so called coupling fingers—right up to any conceivable free form.

According to the invention, basically all known connecting or fastening members suitable for connecting wooden construction elements to e.g. metal members come into consideration as fastening members, such as screw-shaped, pin-shaped, strip-shaped or nail-shaped fastening members, which are screwed, hammered and/or also (additionally) adhered into the wooden construction element. It is also possible to provide brackets or additional fittings which are separately connected to the wooden construction element and which are connected to the coupling element according to the invention e.g. via a suitable positive engagement. Full adhesion is also conceivable and provided according to the invention.

Preferred embodiments provide that the coupling arrangement has at least one (in particular elongate) coupling finger which is pivotally connected to the mounting node via one joint each and can be pivoted between a space-saving rest position (packaging or transport position) and an installation position (i.e. the work position in the installed state). As a result, space can be saved during packaging, storage and transport, and the handling during the assembly at the building site is markedly facilitated.

According to the invention, the coupling arrangement is designed in such a way that, in the installed state, the underside thereof comes to lie on the upper side of the wooden construction element and can be connected to the wooden construction element by fastening members.

There are embodiments, where the coupling arrangement is designed in such a way that it can be connected to the wooden construction element by means of screw-shaped, pin-shaped or nail-shaped fastening members, in particularly preferably by means of self-drilling wood screws since such fastening members are highly developed and researched, highly efficient, cost-effective and can be used and handled with ease and reliably.

Such fastening members have an elongate shaft which passes into the wooden construction element and which usually has a rotationally symmetric sheathing end, and thus have an axis—hereinafter referred to as the fastening member axis. In timber construction, it is common practice to use e.g. self-drilling wood screws which are known in a multitude of designs and specifications optimized for the respective intended use (fully threaded screws, partially threaded screws, double threaded screws, diverse thread, shaft and screw head specifications, etc.). The term "wood screws" here designates screws for connecting members and structural elements made of wood.

There are designs, the fastening member axes of which extend both in relation to a surface of the wooden construction element and/or in relation to the radial direction (i.e. the direction of the mounting node to the point at which the fastening member axis passes through the underside of the coupling arrangement) not only at right angles but also "obliquely", i.e. at an angle of inclination θ and/or a horizontal angle φ.

The angle of inclination θ is here and below defined as follows: the angle of inclination θ is the angle which is enclosed by the fastening member axis and the normal vector n of the underside of the coupling arrangement—which, in the installed state, is parallel to the upper side of the wooden construction element. The angle of inclination θ thus describes by how many degrees the fastening member axis is guided in oblique fashion in relation to the normal with respect to the upper side of the wooden structural element and is thus 0° when, in the installed state, the fastening member axis is at right angles to the upper side of the wooden construction element. It is thus also clear that the angle of inclination θ can basically be between 0° and 90°. When θ=90°, the fastening member would, however, be parallel to the upper side of the wooden construction element in the installed state and would therefore not penetrate the wooden construction element. A range applicable in practice for θ is therefore the range between 0° and maximally about 80°. In some of the preferred embodiments, θ is between 30° and 60°, in particular about 45°.

The horizontal angle φ is here and below defined as follows: the coupling plane shall be the plane spanned by the underside of the coupling arrangement, the point O shall be the center of the mounting node that is situated in the coupling plane, the point P shall be the intersection point, where the fastening member axis intersects the coupling plane, the radial vector r shall be the vector which runs from the center O to the point of intersection P, and s' shall be the direction vector of the projection of the fastening member axis on the coupling plane, then the horizontal angle φ is the angle which is enclosed by the direction vector s' with the radial vector r. (For the purpose of illustration of this definition reference is here made to FIG. 5a and FIG. 5b).

The horizontal angle φ can basically assume any value ranging from between 0° and ±180° (i.e. from 0° to 360°). In some embodiments of the invention, values of φ are, however, particularly preferred in the quadrant from −45° to +45° or in the quadrant from +135° to −135°.

For ease of reading and understanding, some advantages of obliquely guided fastening member axes are here exemplified by the concrete example of screws. However, they apply to all fastening members mentioned, which have a fastening member axis.

Screws which, in relation to the upper side of the wooden construction elements, are guided obliquely, can be longer than in the case in which they are guided at right angles, before they break through the wooden construction element on the underside and thus are clamped better. Furthermore, "inner frameworks" can be realized in the wooden construction element with obliquely guided screws, which increases the load-bearing capacity. In addition, the loads can be introduced into larger volumes of the wooden construction elements with obliquely inclined screws, which likewise increases the load-bearing capacity.

In summary, it is provided in further advantageous embodiments of the connecting device according to the invention that the coupling arrangement is designed in such a way that it can be connected to the wooden construction element by means of screw-shaped, pin-shaped or nail-shaped fastening members, in particular by means of preferably self-drilling wood screws, and the coupling arrangement has fastening member bores which substantially define the position of the fastening member axes (i.e. according to typical tolerances), and wherein these fastening member bores are designed in such a way that, in the installed state, the fastening member axis and the normal vector n of the underside of the coupling arrangement respectively enclose the angle of inclination θ, wherein θ ranges from 0° to 80°, preferably θ ranges from 30° to 60°, in particular θ is about 45°, and the direction vector s' of the projection of the fastening member axis on the coupling plane—defined by the underside of the coupling arrangement—together with the radial vector r lying in the coupling plane encloses the horizontal angle φ, wherein the radial vector r runs from the center O of the mounting node that lies in the coupling plane to the point of intersection P, in which the fastening member axis intersects the coupling plane (i.e. r=P−O), and wherein the horizontal angle φ ranges from 0° to ±180° (i.e. from 0° to 360°), in particular φ assumes values in the quadrant from −45° to +45° or in the quadrant from +135° to −135°.

In such embodiments, in which the coupling apparatus is designed in such a way that it can be connected to the wooden construction element by means of screw-shaped, pin-shaped or nail-shaped fastening members (in particular by means of self-drilling wood screws), it is also provided that the guidance of the fastening members (i.e. the determination of the position or the above mentioned angles θ and φ of the fastening member axis) is not made by the coupling apparatus itself but that the connecting device according to the invention has one or more fastening member blocks for this purpose, which, in the installed state, come to lie on the upper side of the coupling apparatus, or are connected thereto a priori. This is advantageous because the task of the "fastening member guide" can thus be focused on the fastening member block and the areas of the coupling; arrangement where no fastening members are guided can be optimized as regards the relationship between weight or material used and strength.

Furthermore, tins embodiment is sometimes easier to manufacture and thus more cost-effective because e.g. the coupling fingers can be made e.g. from continuous rolled sections, extruded sections or sheet metal bended sections (e.g. T section, I section, etc.) and the fastening member blocks can be made as separate components. Another advantage results when the fastening member blocks are not a priori connected to the coupling apparatus but—as also provided according to the invention—are separate components of the connecting device which come to lie on the upper side of the coupling apparatus in the installed state for the first time: As a result, it is possible—as specified below—to introduce or provide structure-borne sound insulating elements between the coupling apparatus and the fastening blocks.

In a consideration of these explanations relating to the fastening member blocks in combination with the above explanations relating to the fastening member bores and/or axes, it is thus provided in further embodiments that the connecting device according to the invention has at least one fastening member block which, in the installed state, comes to lie on the upper side of the coupling arrangement or is a priori connected thereto, the coupling arrangement and the fastening member block are designed in such a way that the coupling arrangement can be connected to the wooden construction element by means of screw-shaped, pin-shaped or nail-shaped fastening members which pass through the fastening member block, in particular by means of self-drilling wood screws, the fastening member block has one or more fastening member bores, which substantially (i.e. according to typical tolerances) determine the position of the fastening member axes and wherein the fastening member bores are designed in such a way that, in the installed state, the fastening member axis with the normal vector n of the underside of the coupling arrangement respectively encloses the angle of inclination θ, wherein θ ranges from 0° to 80°, preferably θ ranges from 30° to 60°, in particular θ is about 45°, and the direction vector s' of the projection of the fastening member axis on the coupling plane—defined by the underside of the coupling arrangement—together with the radial vector r lying in the coupling plane encloses the horizontal angle φ, wherein the radial vector r runs from the center O of the mounting node that lies in the coupling plane to the point of intersection P, in which the fastening member axis intersects the coupling plane (i.e. r=P−O), and wherein the horizontal angle granges from 0° to ±180° (i.e. from 0° to 360°), in particular φ assumes values in the quadrant from −45° to +45° or in the quadrant from +135° to −135°.

There are designs in which the mounting node (i.e. as explained above the component of the connecting device which is mounted on the support) consists of the following (separate) components and/or includes the following components:

a coupling node, by means of which the coupling arrangement is connected in the installed state, a support body projecting downwards in the installed state and, in the installed state, is connected to the double node as well as, in the installed state, passes through the wooden construction element or comes to lie at the edge of the wooden construction element, a lower mounting body which, in the installed state, is connected to the lower support body and is designed for the mounting or the assembly on the (lower) support and which can also be designed in particular in such a way that it can serve as a mounting for the wooden construction element.

This breakdown of the mounting node into the (separate) components (coupling node, lower support body, lower mounting node) has e.g. advantages with respect to an easy manufacture and also with respect to an easy assembly during installation and further advantages which are explained below.

There are designs in which the mounting node has the following further components:

an upper support body which projects upwards in the installed state and which, in the installed state, is connected to the coupling node, an upper mounting body which, in the installed state, is connected to the upper support body and is designed for mounting a further (i.e. upper) support.

Due to the formation with the upper support and mounting body it is—e.g. for building multi-story structures—possible to mount a further (upper) support on the mounting node, wherein the load is passed from the lower to the upper support advantageously only through the mounting node—made of resilient material, such as steel—and the comparatively sensitive wooden construction element is not loaded by this.

In the above embodiments with separate components of the mounting node (coupling node, lower/upper support body, lower/upper mounting body), it is also provided according to the invention that the coupling node, the lower support body and the lower mounting body are designed in such a way that the distance between coupling node and lower mounting body is adjustable and/or the coupling node, the upper support body and the upper mounting body are designed in such a way that the distance between coupling node and upper support body is adjustable.

As a result, it is possible to compensate for inaccuracies e.g. in situ at the building site. Furthermore, a connecting system can be offered by means of the connecting device according to the invention, which is equally suitable for wooden members having different thickness, which is advantageous from the view of both the manufacturer and the customer.

There are embodiments in which the connecting device is designed in such a way that at last two, in particular several or even all, of the components or members of the connecting device, which are connected to one another in the installed state, can be detachably connected to one another, in particular via screw, clamp, bolt, splint or bayonet connections.

As a result, the connecting device can be offered as a modular connecting system, the components of which can be combined as individual modules depending on the use case, which is advantageous from the view of both the manufacturer and the customer. Furthermore, this detachably connectable design (i.e. the take-apart capability) allows a space-saving packaging for storage and transport, which is another advantage.

Although buildings with wooden members have many advantages over other building types (e.g. steel construction, concrete construction, brick building, etc.), their disadvantage is that they are very critical as far as structure-borne sound transmission is concerned. Therefore, it is also provided according to the invention that the connecting device has a structure-borne sound insulating unit which is designed in such a way that, in the installed state, the structure-borne sound transmission from the wooden construction element via the connecting device to the lower support and/or to the upper support—and thus to further members of the structure—is insulated or attenuated. Naturally, the structure-borne sound transmission is thus, of course, also insulated or attenuated in reverse direction.

Therefore, there are designs in which, in the installed state, at least part of the flow of forces runs from the wooden construction element via the connecting device to the lower support and/or at least part of the flow of forces runs from the wooden construction element via the connecting device to the upper support in each case via at least one insulating element which is designed to insulate or attenuate the structure-borne sound transmission.

In principle, all materials are suitable for the insulating elements, said materials having an (inner) insulation with respect to the application with sound vibrations, which convert at least part of the sound energy with which they are supplied into heat, such as cork, rubber or a wide variety of plastic materials, elastomers and composite materials. Furthermore, the insulating elements can also be made as more complex devices, such as insulated suspension systems with e.g. hydraulic insulation elements. Such insulated suspension elements can also be designed in such a way that they also have an insulating effect in the infrasonic range (i.e. with frequencies below 20 hertz) and thus insulate or dissipate e.g. the vibrations produced by an earthquake.

In preferred embodiments, it is provided that, in the installed state, the connecting device according to the invention includes the following:

at least one insulating element which is arranged between the upper side of the wooden construction element and the underside of the coupling arrangement and/or at least one insulating element which is arranged between the upper side of the coupling; arrangement and the underside of the fastening member block and/or at least one insulating element which is arranged between the underside of the wooden construction element and the lower mounting body and/or at least one insulating element which is arranged between the mounting node and the lower support or between the lower mounting body and the lower support and/or at least one insulating element which is arranged between the mounting node and the upper support or between the upper mounting body and the upper support.

The invention does not only relate to the previously explained connecting device but also to a wooden construction arrangement having a connecting device according to the invention with a (lower) support and wish a wooden construction element which can be made in particular from cross laminated timber, wherein this wooden construction arrangement is characterized in that the connecting device is mounted on the support and the wooden construction element is attached to the connecting device in suspended fashion or the connecting device is connected to the wooden construction element on the upper side thereof. Of course, the support is here not only made of wood but also of steel, concrete or any other material able to take a load.

Furthermore, the invention also relates to a structure having such an above mentioned wooden construction arrangement.

Further aspects and features of the present invention follow from the dependent claims, the attached drawings and the below description of preferred embodiments.

BRIEF DESCRIPTION OF THE DRAWING

Embodiments of the invention are now described by way of example and with reference to the drawings, wherein.

DESCRIPTION OF EMBODIMENTS

Figure 1:
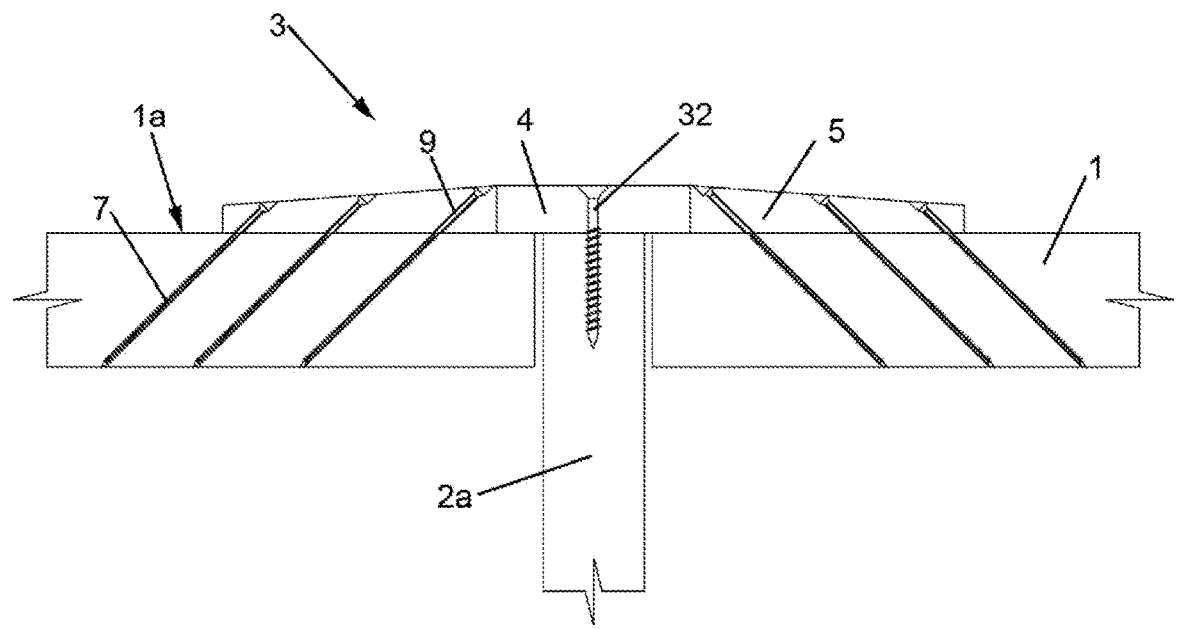
FIG. 1 shows a schematic illustration of a sectional side view of a connecting device according to the invention which is mounted on the support and is connected to the wooden construction element.

FIG. 1 shows in a schematic outline a sectional side view of a connecting device 3 according to the invention in an installed state, i.e. mounted on the support 2*a* and connected to the wooden construction element 1. The mounting node 4 is mounted on the upper end face of the support 2*a* and attached to the head of the support 2*a* by means of screw 32. (Of course, other possibilities of fastening the mounting node 4 to the head of the support 2*a* are also conceivable and provided.)

The coupling arrangement 5 is connected to the mounting node 4 and, in the installed state, projects from the mounting node 4 and comes to lie via its underside on the upper side 1*a* of the wooden construction element 1 as well as is designed in such a way that it can be connected to the wooden construction element by fastening members 7. Here, basically all known connecting and/or fastening members suitable for connecting wooden construction elements to e.g. metal members come into consideration, such as screw-shaped, pin-shaped, strip-shaped or nail-shaped fastening members, which can be screwed, hammered and/or also (additionally) adhered into the wooden construction element. Brackets or additional fittings can also be provided. They are separately connected to the wooden construction element and are connected to the coupling element according to the invention e.g. via a suitable positive engagement. Full adhesion is also conceivable and provided according to the invention.

In the embodiment shown as a schematic outline in FIG. 1, in particular self-drilling wood screws are provided as fastening members 7, which are screwed through the fastening member bores 9 into the wooden construction element 1.

FIG. 1 shows that, in the installed state, the wooden construction element 1 is mounted on the coupling apparatus 5 in suspended fashion. The support force acting upwards is introduced via the mounting node 4 made of a resilient material. The flow of forces introduced into the mounting node 4 at the comparatively small mounting area is distributed via the fastening members 7 (here: wood screws) arranged in a larger area over a comparatively large volume of the wooden construction element.

FIG. 1 also shows that no further components come to lie on the underside of the wooden construction element. The components on the upper side 1a are covered e.g. in the case of ceiling constructions by the floor structure of the story thereabove.

Figure 2:
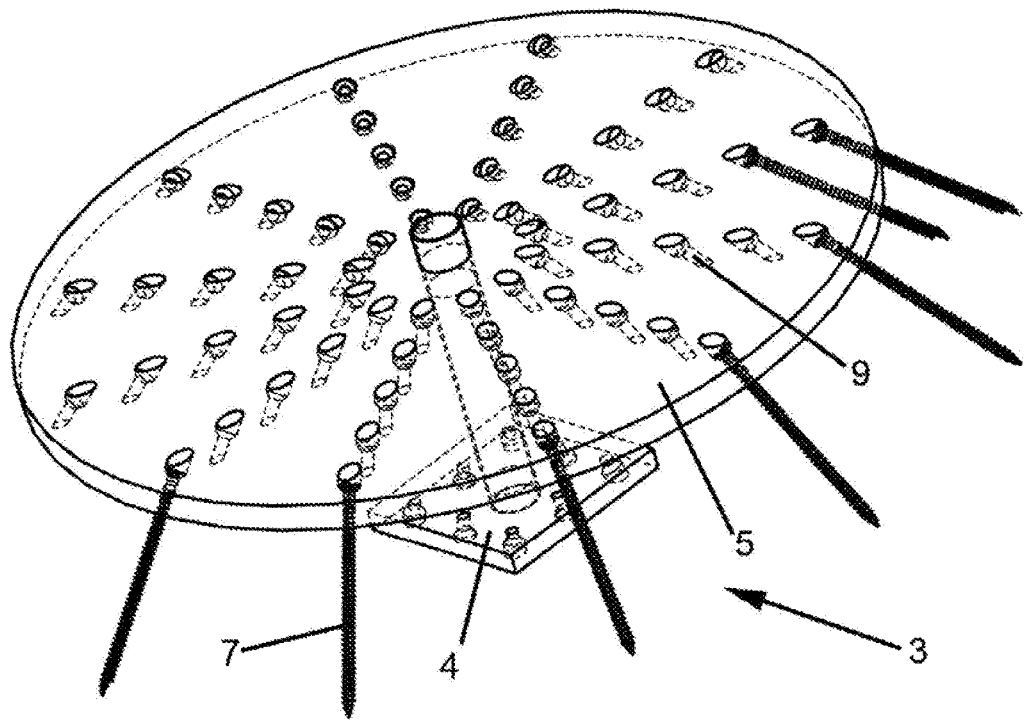
FIG. 2 shows an oblique view of a connecting device according to the invention with circular coupling arrangement.

FIG. 2 shows an oblique view of a connecting device 3 according to the invention, wherein here the coupling arrangement 5 is designed as a circular disk to be produced in an easy and cost-effective way. Of course, other, more complex designs of the coupling arrangement 5—right up to any conceivable free form—are also provided according to the invention.

However, the coupling arrangement 5 shall, in the installed state, (at least with partial areas on the underside thereof) abut on the upper side 1a of the wooden construction element 1 and be connectable to the wooden construction element 1 by fastening members 7. In the embodiment illustrated in FIG. 2, the coupling arrangement 5 also has fastening member bores 9, such that it can be connected by means of screw-shaped, pin-shaped or nail-shaped fastening members 7, such as wood screws, to the wooden construction element 1 (not shown in FIG. 2). In the embodiment shown in FIG. 2, the mounting node 4 is designed in such a way that, in the installed state, it is not the support (not shown herein) that passes through the wooden construction element 1 but the mounting node 4, which can be designed in a particularly resilient way.

Figure 3:
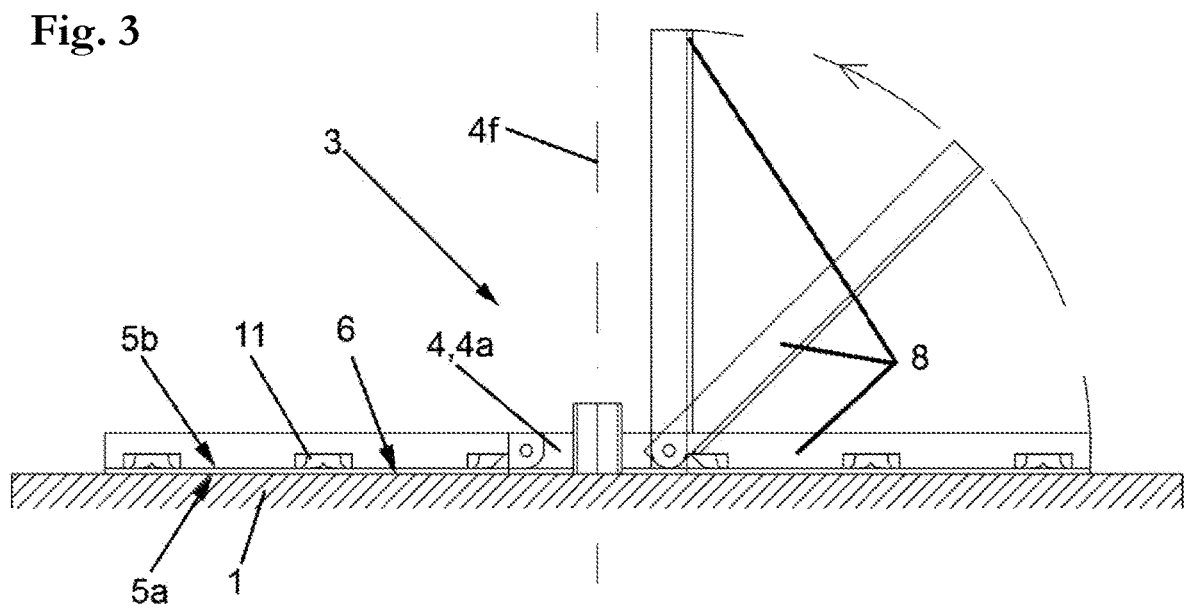
FIG. 3 shows a sectional side view of a connecting device according to the invention, the coupling arrangement of winch has pivotable coupling fingers.

FIG. 3 shows a sectional side view of a connecting device 3 according to the invention, in which coupling arrangement 5 has (elongate) coupling fingers 8, which are pivotally connected to the mounting node 4 via a respective joint and can be pivoted between a space-saving packaging or transport position (rest position) and the installation position (i.e. the work position in the installed state), which is advantageous for both packaging, storage as well as transport and the on-site handling and assembly at the building site. In the installed position, the coupling fingers 8 run parallel to the coupling plane 6. In the packaging or transport position, the coupling fingers 8 run parallel to the vertical axis 4f of the mounting node 4, and the coupling fingers 8 can thus be folded into a space-saving "bundle".

Figure 4:
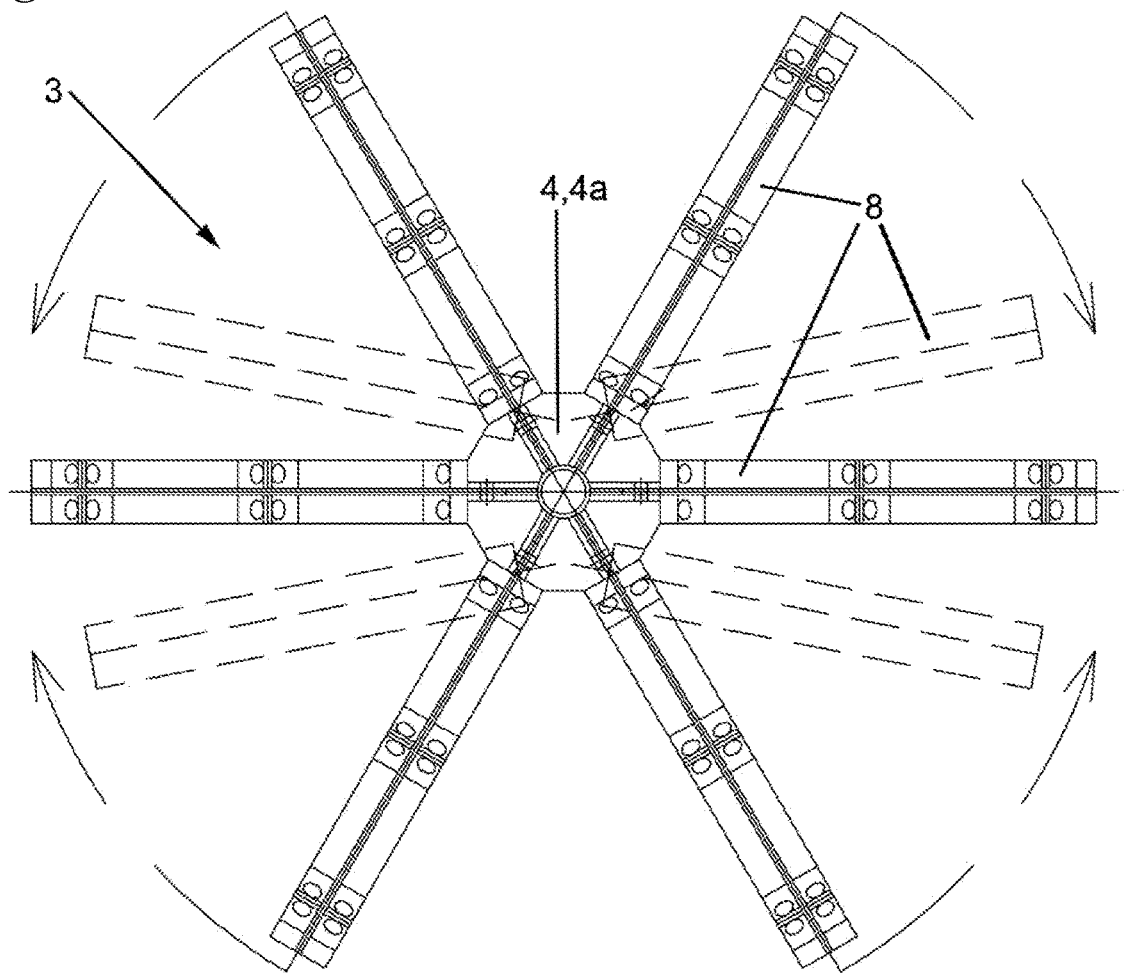
FIG. 4 shows a schematically outlined top view of a further embodiment of a connecting device according to the invention with pivotable coupling fingers.

FIG. 4 shows a further embodiment of a connecting device 3 according to the invention with pivotable coupling fingers 8. In contrast to FIG. 3, the coupling fingers 8 in FIG. 4 run parallel to the coupling plane in both the installed position and the packaging or transport position. However, here too, the coupling fingers 8 can be pivoted in such a way that, in the packaging or transport position, they are placed parallel to one another as a space-saving "bundle" (dashed illustration).

Figure 5A:
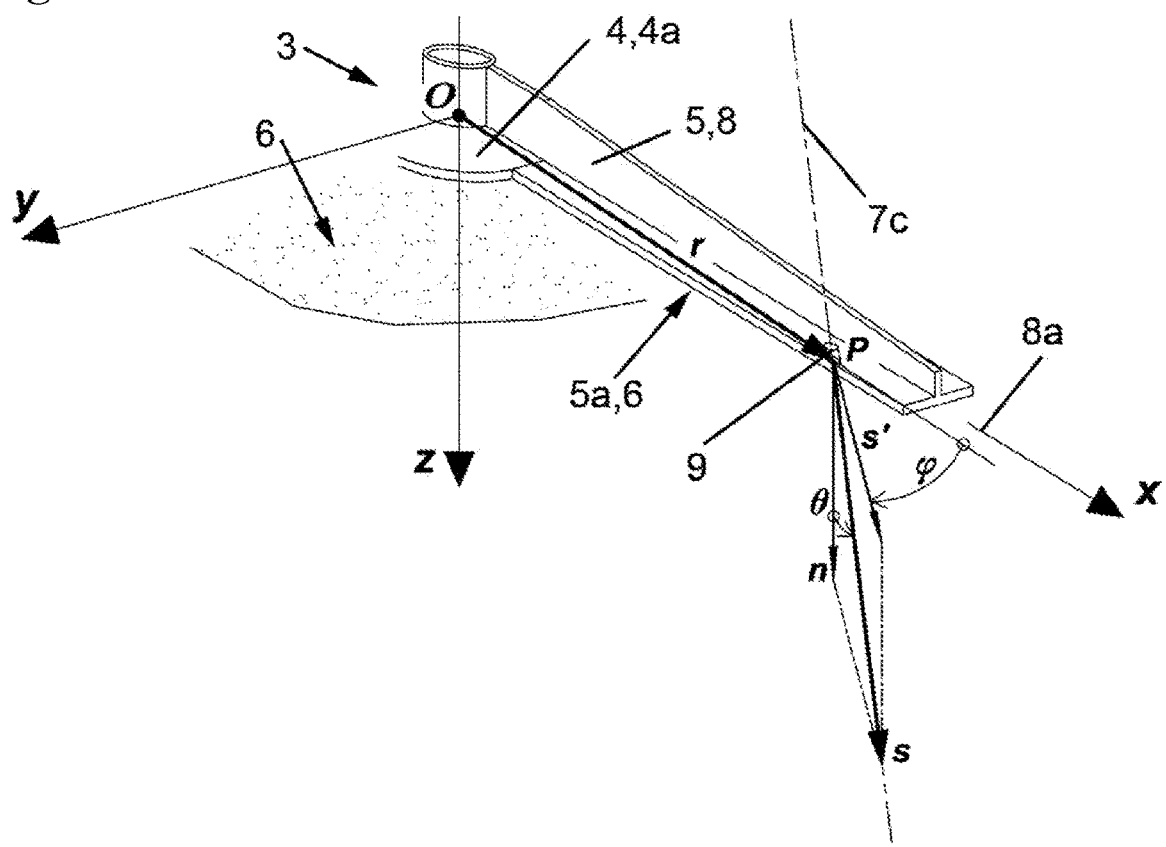
FIG. 5*a* shows a schematically illustrated oblique view of a section of the connecting device according to the invention, in which the coupling arrangement is designed in such a way that it can be connected to the wooden construction element by means of screw-shaped, pin-shaped or nail-shaped fastening member and in which, in the installed state, the fastening member axis is guided by an angle of inclination $\theta$ and the horizontal angle $\varphi$.

FIG. 5a shows an oblique view of a section of a connecting device 3 according to the invention. The coupling arrangement 5 is designed as a coupling finger 8. The coupling arrangement 5 or the coupling finger 8 is designed in such a way that it can be connected to the wooden construction element 1 by means of screw-shaped, pin-shaped or nail-shaped fastening members 7 and has a fastening member bore 9, which defines the position, the angle of inclination θ and the horizontal angle φ of the fastening member axis 7c.

The direction vector s of the fastening member axis 7c and the normal vector n enclose the angle of inclination θ towards the underside of the coupling arrangement 5.

The radial vector r runs from the center O of the mounting node 4 that is situated in the coupling plane 6 to the point of intersection P, in which the fastening member axis 7c intersects the coupling plane 6 (i.e. r=P−O, wherein P and O are the position vectors of said points). The vector s' is the projection of the direction vector s of the fastening member axis 7c on the coupling plane 6, and, together with the radial vector r, encloses the horizontal angle φ, which can assume any value between 0° and 360°. If—as is common practice—φ is associated clockwise with positive values and counterclockwise with negative values, the horizontal angle φ can assume any value between 0° and ±180°.

Figure 5B:
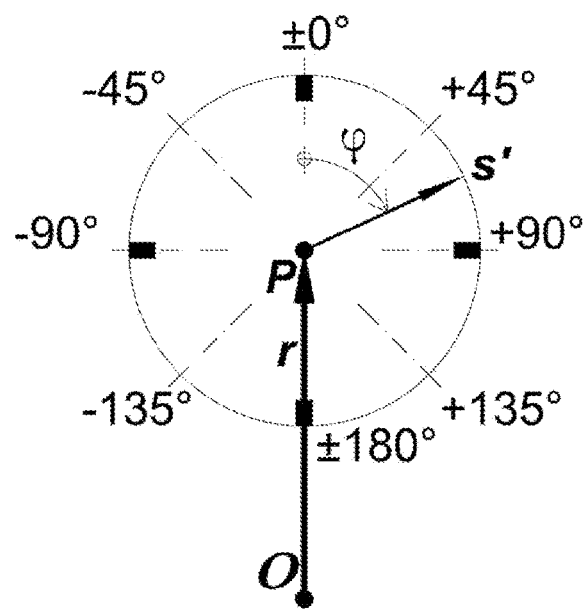
FIG. 5*b* shows a top view of the points, vectors and angles shown in FIG. 5*a* for the illustrating explanation of the horizontal angle $\varphi$.

FIG. 5b shows byway of diagram the projection of the points, vectors and angles on the coupling plane 6, as illustrated in FIG. 5a. The consideration of FIG. 5a and FIG. 5b in combination shows that the horizontal angle φ can assume any values between 0° and 360° or between 0° and ±180°. As explained below, the horizontal angles φ can, however, assume values in the quadrant between −45° and +45° or in the quadrant between +135° and −135°—in particular in embodiments in which the coupling arrangement 5 is designed in the form of elongate coupling fingers 8.

Figure 6:
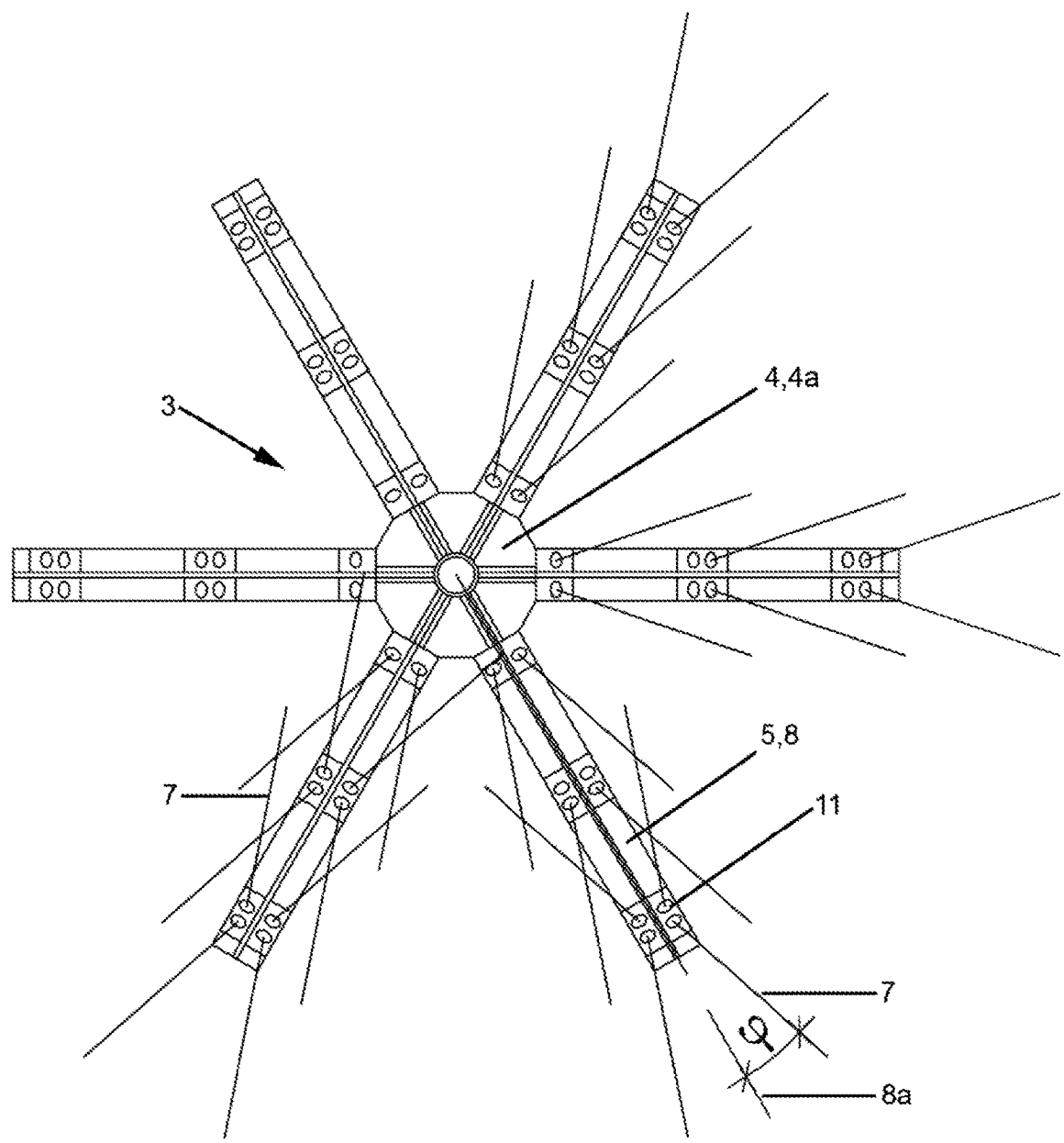
FIG. 6 shows a schematically outlined top view of a connecting device according to the invention, in which the coupling arrangement is formed of six radially arranged coupling fingers with fastening member blocks.

FIG. 6 shows a top view of a connecting device 3 according to the invention, in which the coupling arrangement 5 consists of six radially arranged coupling fingers 8, each having fastening member blocks 11. In the installed state, the fastening members 7 pass through the fastening member blocks 11, which are designed in such a way that they basically (i.e. on the basis of typical tolerances) define the position of the fastening member axes 7c and/or the respective angle of inclination θ and the respective horizontal angle φ. In this FIG. 6, the fastening members 7 (or the fastening member axes 7c) are shown as lines in simplified symbolized fashion.

The illustrated arrangement, in which the fastening members 7 do not extend below the (comparatively narrow) coupling fingers 8 but are respectively "twisted" in relation to the longitudinal axes 8a of the coupling fingers about a horizontal angle φ (i.e. φ unequal 0° and unequal ±180°, effect a more widely distributed load introduction via the fastening members 7 into the wooden construction element 1 and into a volume range which is markedly larger than the one directly below the coupling fingers 8.

Figure 7:
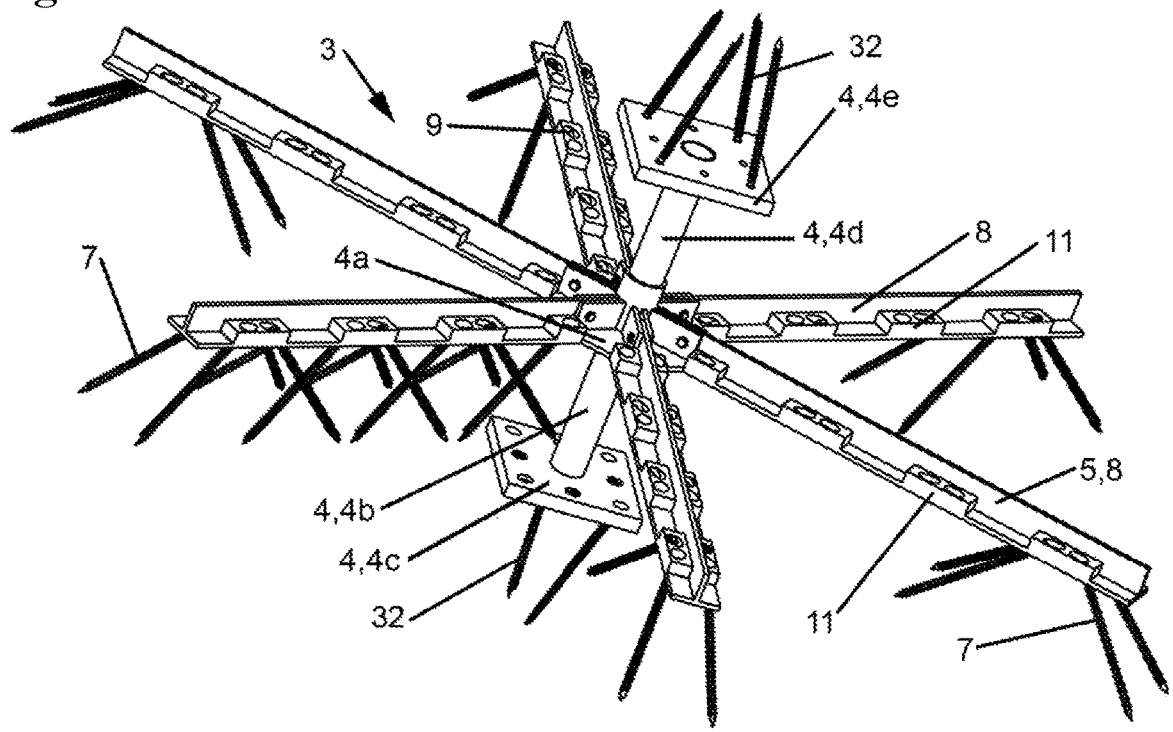
FIG. 7 shows an oblique view of a connecting device according to the invention with coupling fingers as in FIG. 6, wherein the mounting node here has a coupling node, a lower support body and a lower mounting body as well as an upper support body and an upper mounting body.

FIG. 7 shows an oblique view of a connecting device 3 according to the invention with coupling fingers 8 as in FIG. 6. In the embodiment shown in FIG. 7, the mounting node 4 includes the following:

a coupling node 4a, to which the coupling arrangement 5 (or here: coupling finger 8) is connected, a lower support body 4b projecting downwards in the installed state, which, in the installed state, is connected to the coupling node 4a, a lower support body 4c, which, in the installed state, is connected to the lower support body 4b and is designed for the mounting or the assembly on the (lower) support 2a, an upper support body 4d projecting upwards in the installed state, which, in the installed state, is connected to the coupling node 4a, an upper mounting body 4c, which, in the installed state, is connected to the upper support body 4d and is designed for the mounting or the assembly on the upper support 2a.

In the embodiment shown in FIG. 7, the lower mounting body 4c and the upper mounting body 4e are furthermore designed in such a way that—based on the respective mounting area—they can be connected to the respective support 2a, 2b by means of obliquely guided screws 32.

FIG. 7 also shows that the obliquely guided fastening members 7 (here: wood screws) are come to lie outside the volumes which are disposed below the—comparatively narrow—coupling fingers, which improves the load introduction into the wooden construction element 1 (not shown herein).

Figure 8:
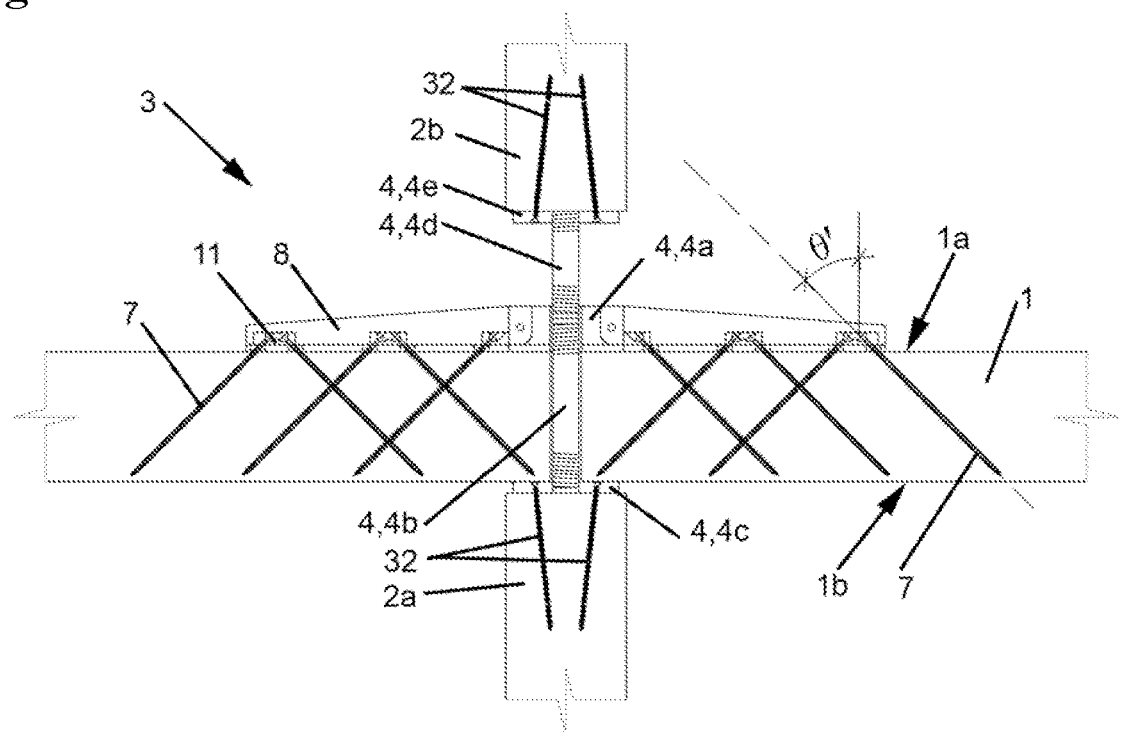
FIG. 8 shows a sectional side view of the connecting device according to FIG. 7 in the installed state.

FIG. 8 is a sectional side view of a connecting device 3 similar to that in FIG. 7 in the installed state. The mounting node 4 and/or, in this case, its component, mounting body 4*c*, is mounted on the lower support 2*a* and attached to the head of the lower support 2*a* by means of screws 32.

The lower support body 4*b* is detachably connected to the mounting body 4*c* via a screw connection. The lower support body passes through the wooden construction element 1 and is detachably connected to the coupling node 4*a* via a screw connection. The coupling node 4*a* is detachably connected to the lower support body 4*b* via a screw connection and protrudes upwards to the upper mounting body 4*e*, which is detachably connected to the upper support body via a screw connection.

The upper support 2*b* is mounted on the upper mounting body 4*e* and attached by means of screws 32. The coupling fingers 8 are connected to the coupling node 4*a* and come to lie on the upper side of the wooden construction element 1 and are themselves connected to the wooden construction element 1 by the fastening members 7 (here: self-drilling wood screws). The angle θ' shown in FIG. 8 is the projection of the angle of inclination θ of the fastening member axis on the image and/or sectional plane of the figure.

It is also possible for the lower mounting body 4*c* and/or the upper mounting body 4*e* to be designed in such a way that they do not require any fixation on the respective support 2*a*, 2*b* by the screws 32 or by other fastening members. This can be achieved e.g. by designing the mounting bodies 4*c*, 4*e* in such a way that they are laterally fixed to the support axis by a lateral positive engagement with the respective support 2*a*, 2*b*, e.g. via a collar enclosing the support head or by spikes penetrating the head. A vertical fixation is often unnecessary due to the weight force occurring in structures.

In the embodiment shown in FIG. 8, the lower mounting body 4*c* is designed in such a way that it does not only serve to be mounted on the lower support 2*a* or a foundation but, in turn, also serves as a mounting for the wooden construction element 1. In a combined consideration with the above described fact that components 4*a*-4*e* o the mounting node 4 are detachably connectable to one another—this is particularly advantageous as regards the assembly: First, the lower mounting body 4*c* and the lower support body 4*b* are attached to the head of the support 2*a*. Then, the wooden construction element 1 can be mounted provisionally on the lower support body 4*c* and is already in the installation position without the aid of e.g. auxiliary supports or frameworks. Thereafter, the coupling node 4*a* is attached from above with the coupling arrangement 5 to the lower support body 4*b* and the coupling arrangement 5 is subsequently connected to the wooden construction element 1. This assembly possibility from above and without e.g. auxiliary supports is considerably more convenient and safer especially in ceiling constructions than any assembly from below.

Figure 9:
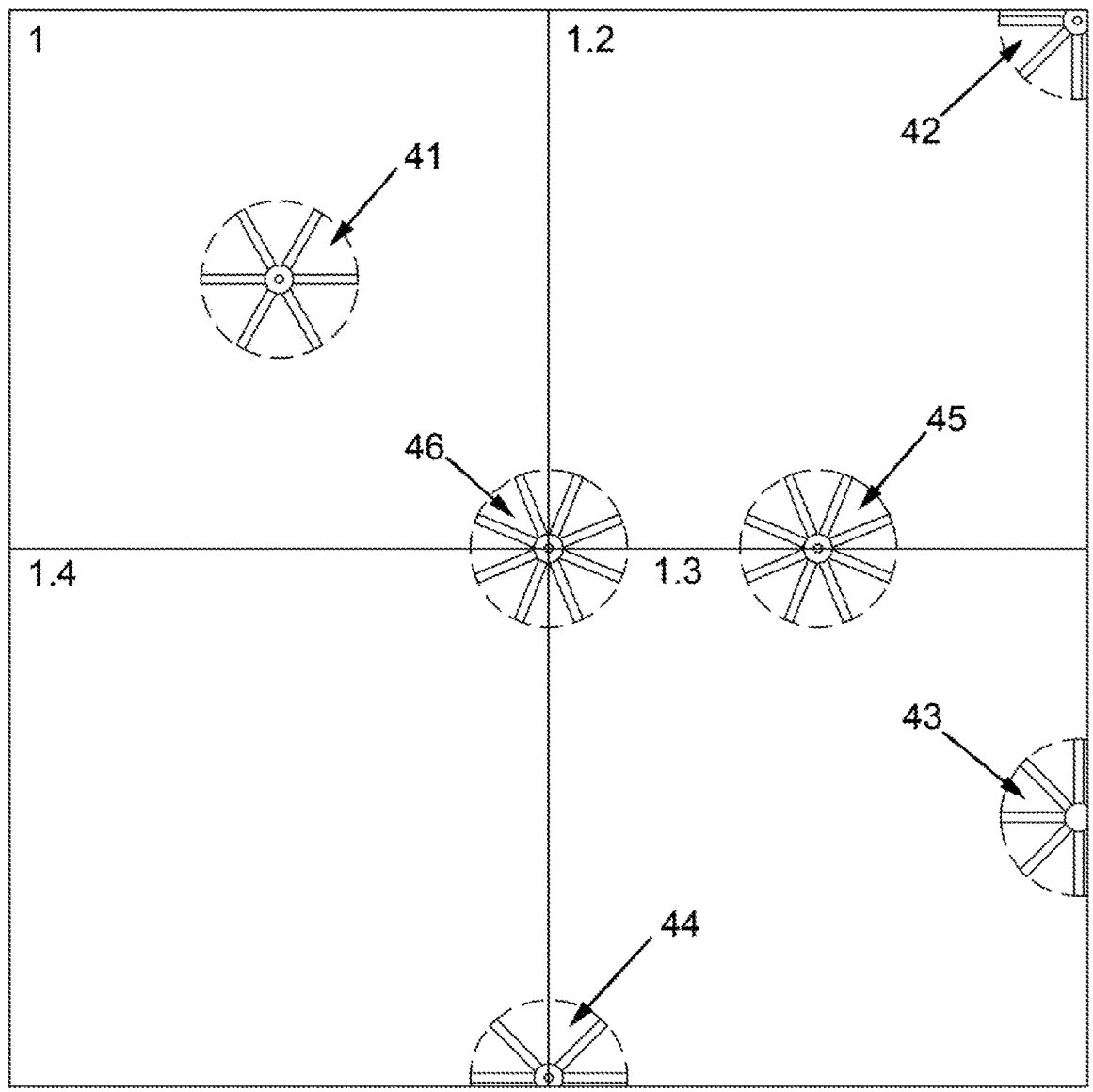
FIG. 9 shows a schematically illustrated top view of various use examples or associated embodiments of the connecting device according to the invention for mounting wooden construction elements in the form of panels.

FIG. 9 shows in a schematically outlined top view various examples of use or associated embodiments of the connecting device 3 according to the invention for mounting wooden construction elements in the form of panels—hereinafter referred to as "panels":

Arrow 41 points to a mounting according to the invention in the panel center of panel 1.
Arrow 42 points to a mounting according to the invention at the corner of panel 1.2.
Arrow 43 points to a mounting according to the invention at an edge of panel 1.3.
Arrow 44 points to a mounting according to the invention at the T-joint of panels 1.3 and 1.4, situated at the edge.
Arrow 45 points to a mounting according to the invention at the longitudinal joint of panels 1.2 and 1.3.
Arrow 46 points to a mounting according to the invention at the corner of the four panels 1, 1.2, 1.3 and 1.4.

It is clear from this illustration that not only one panel but a plurality of panels can be mounted by the connecting device according to the invention and that in the case of designs having a lower support body 4*b* this support body 4*b* does not necessarily pass through the wooden construction element 1 but can also come to lie on an edge (plus corner) of the wooden construction element 1.

Figure 10:
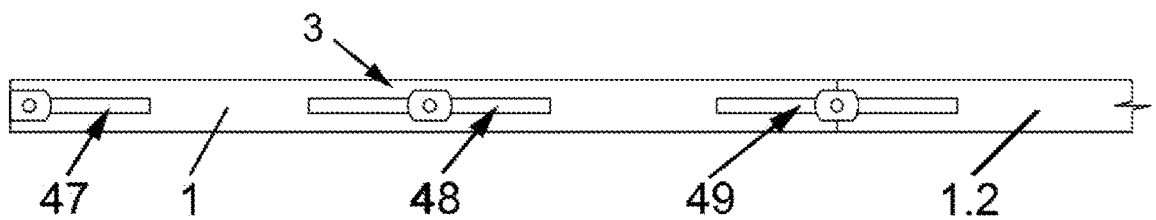
FIG. 10 shows a schematically outlined top view of various examples of use or associated embodiments of the connecting device according to the invention for mounting wooden construction elements in the form of beams.

FIG. 10 shows in a schematically outlined top view various examples of use or associated embodiments of the connecting device 3 according to the invention for mounting wooden construction elements in the form of beams—hereinafter referred to as "beam".

Arrow 47 points to a mounting according to the invention at the left-hand end of beam 1.
Arrow 48 points to a mounting according to the invention approximately in the center of beam 1.
Arrow 49 points to a mounting according to the invention at the joint of beam 1 and beam 1.2.

Figure 11:
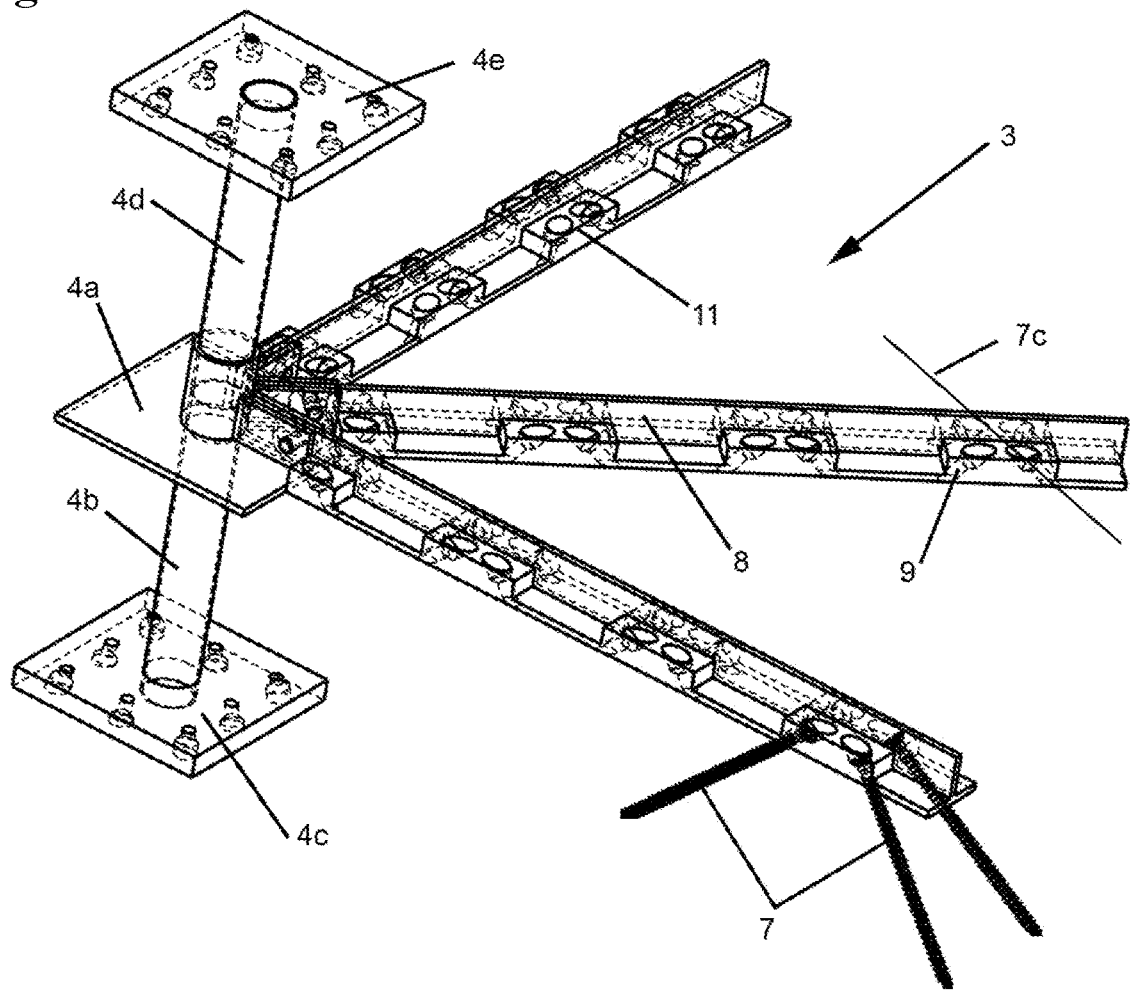
FIG. 11 shows an oblique view of a connecting device according to the invention that is similar to that in FIG. 8, which is designed for mounting a wooden construction element in the form of a panel on a corner or designed for mounting three wooden construction elements in the form of beams, in pairs enclosing an angle of 45°.

FIG. 11 show's an oblique view of a connecting device 3 according to the invention, designed in a way similar to that in FIG. 7 for mounting a wooden construction element in the form of a panel at a corner or designed for mounting three wooden construction elements in the form of beams, which in pairs enclose an angle of 45° each.

Figure 12:
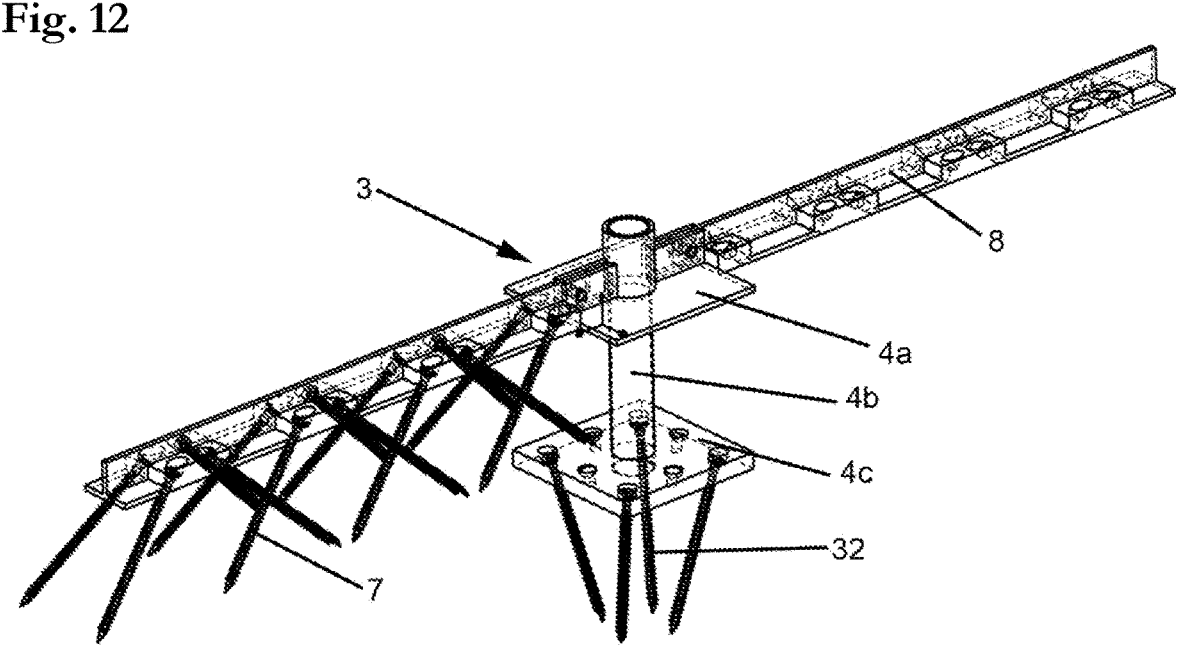
FIG. 12 shows an oblique view of a connecting device according to the invention, which is designed for mounting two wooden construction elements in the form of beams, which abut in flush fashion.

FIG. 12 shows an oblique view of a connecting device 3 according to the invention, which is designed for mounting two wooden construction elements which abut in flush fashion.

Figure 13A:
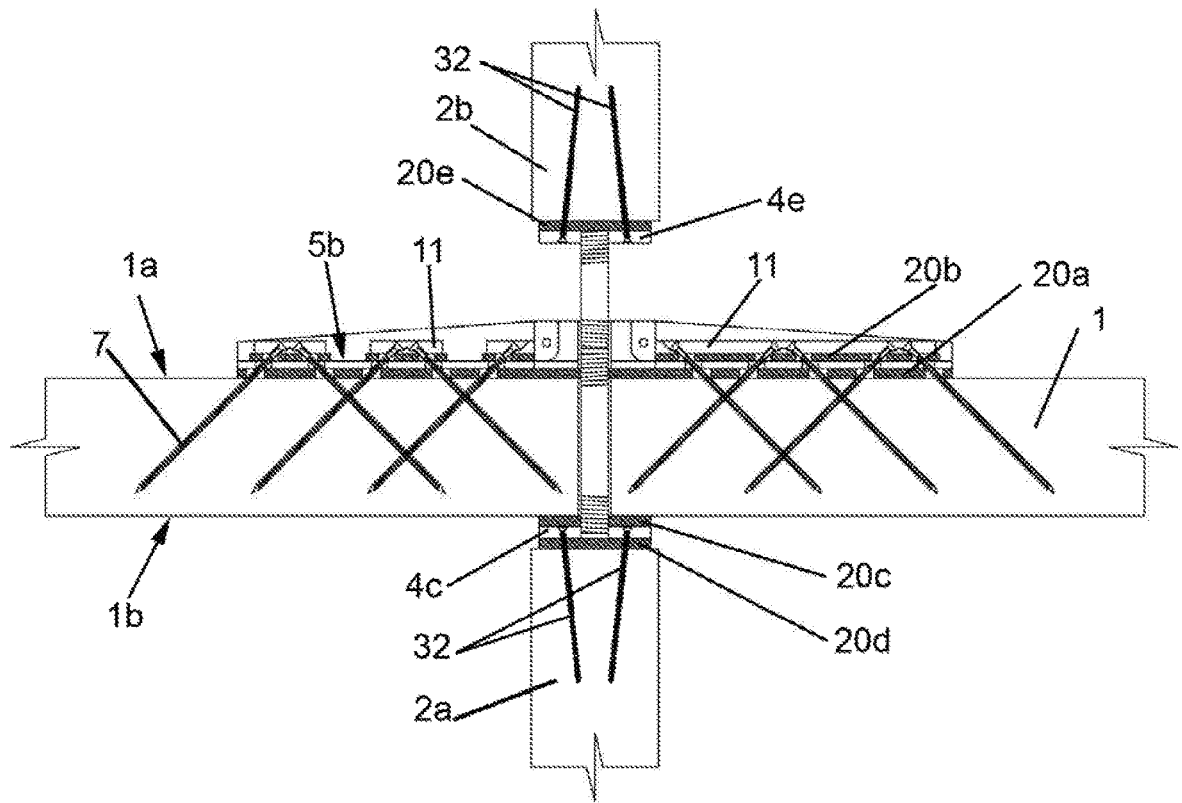
FIG. 13*a* shows a sectional side view of a connecting device according to the invention in the installed state with a plurality of insulating elements.

FIG. 13*a* shows a sectional side view of a connecting device according to the invention in the installed state, which has insulating elements 20*a*-20*e*.

Figure 13B:
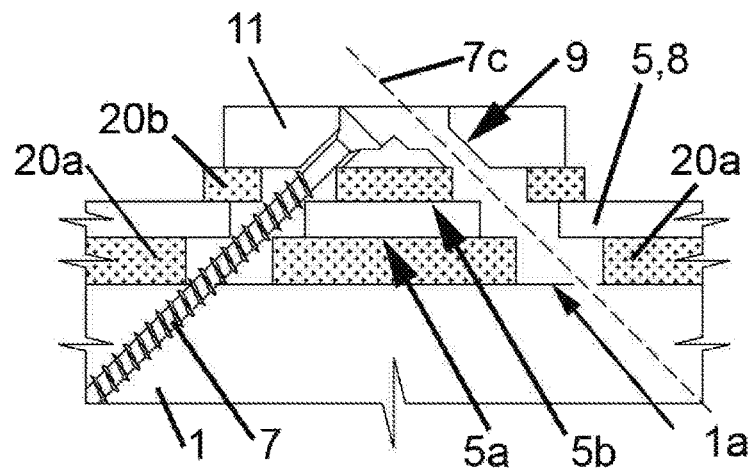
FIG. 13*b* shows an enlarged detailed view of FIG. 13*a* within the range of a fastening member block.

FIG. 13*b* shows an enlarged detailed view of FIG. 13*a* in the vicinity of a fastening member block 11.

FIGS. 13*a* and 13*b* show that the coupling arrangement 5 comes to lie between the fastening member blocks 11 and the wooden construction element 1 so as to be quasi "mounted in floating fashion" via the insulating elements 20*b* and 20*c*. The coupling arrangement 5 is not connected to the wooden construction element 1 in a rigid or inflexible way but in an elastically damped way and is thus sound-absorbing.

In the present application and the claims, the terms "connect", "connected", "connection" do not only refer to rigid or inflexible connections but also to damped and elastic connections or between the respective members/components. The same also applies, mutatis mutandis, to the terms "attach", "assembly", "mount", "mounting", "fasten" and "fastening".

A consideration of the present explanations and the entire drawings in combination also discloses:
  The formation of the components of the invention is not limited to the simple forms shown in the drawings
  In particular the coupling arrangement 5 or the coupling fingers 8 can be formed in many ways and can be optimized in many ways in particular with respect to their load-bearing capacity and/or with respect to the relationship between use of material and load-bearing capacity.

The invention can be implemented in such a way that it can be disassembled into all its individual components.

The fastening member blocks 11 do not necessarily have to be connected a priori to the coupling arrangement 5 or to the coupling fingers 8 but can be designed as separate members which come to lie according to the invention in the assembled state for the first time.

Likewise, the insulating elements 20a-20e do not have to be connected a priori to other components but can be designed as separate members which come to lie according to the invention in the installed state for the first time.

For reasons of ease of presentation, the upper side 1a of the wooden construction element 1 has been assumed to be a continuously flat surface in all explanations and drawings. Of course, it is e.g. also possible to provide the wooden construction element with recesses which allow a recessed installation of the coupling arrangement 5.

Furthermore, it is also provided to design the connecting arrangement in such a way that a "cambered installation" as referred to among experts becomes possible: In this case, the coupling arrangement 5 is designed in such a way that prior to the assembly of the fastening members 7 the underside 5a thereof does not yet abut on the wooden construction element 1 but is forced to do so by the attached fastening members 7 for the first time. It is thus possible to introduce tensions into the wooden construction element 1, which counteract e.g. the weight-related sag between two mountings.

LIST OF REFERENCE SIGNS 1 wooden construction element
1a upper side 1a of the wooden construction element 1
1b underside 1b of the wooden construction element 1
1.2 second wooden construction element
1.3 third wooden construction element
1.4 fourth wooden construction element
2a (lower) support
2b additional, upper support
3 connecting device
4 mounting node
4a coupling node
4b lower support body
4c lower mounting body
4d upper support body
4e upper mounting body
4f vertical axis of the mounting node 4
5 coupling arrangement
5a underside 5a of the coupling arrangement 5
5b upper side 5b of the coupling arrangement 5
6 coupling plane (defined by the underside 5a of the coupling arrangement 5 or, in the installed state, by the upper side 1a of the wooden construction element 1)
7 fastening member
7a coupling segment of the fastening member 7
7b fastening member head
7c fastening member axis
8 coupling finger
8a longitudinal axis 8a of the coupling finger 8
9 fastening member bore (for the fastening member 7)
10 head support (for the head of the fastening member 7)
11 fastening member block
11a underside 11a of the fastening member block 11
11b upper side 11b of the fastening member block 11
20a-e insulating element 32 screw (for attaching the mounting body 4c, 4e to the supports 2a, 2b)
41-46 embodiment and example of use for mounting wooden construction elements 1 in the form of panels
47-49 embodiment and example of use for mounting wooden construction elements 1 in the form of beams
$\theta$ angle of inclination $\theta$ of the fastening member axis 7c
$\theta'$ projection $\theta'$ of the angle of inclination $\theta$ on the image plane of the respective drawing
$\varphi$ horizontal angle $\varphi$ of the fastening member axis 7c
n normal vector n on the underside 5a of the coupling arrangement 5
O center O of the mounting node 4 that is disposed in the coupling plane 6 (position vector)
P point of intersection between the fastening member axis 7c and the coupling plane 6 (position vector)
r radial vector r, runs from O to P (i.e. r=P–O)
s direction vector s of the fastening member axis 7c
s' direction vector s' of the projection of the fastening member axis 7c on the coupling plane 6

The invention claimed is:

1. A connecting device for mounting a wooden construction element, on a support, the connecting device comprising:
   a. a mounting node which is designed for mounting the connecting device on the support; and
   b. a coupling arrangement which is connected to the mounting node and which, in an installed state, while projecting from the mounting node on an upper side of the wooden construction element, can be connected to the wooden construction element using fastening members which at least partially pass through the wooden construction element, and wherein
   the coupling arrangement is designed in such a way that it can be connected to the wooden construction element in each case along a fastening member axis by means of screw-shaped, pin-shaped or nail-shaped fastening members,
   the coupling arrangement has fastening member bores which determine the position and direction of the fastening member axes, wherein these fastening member bores are designed in such a way that, in the installed state,
   the fastening member axis encloses together with a normal vector n extending from the underside of the coupling arrangement one angle of inclination $\theta$ each, which is 0° to 80° and
   a direction vector s' of the projection of the fastening member axis on a coupling plane defined by the underside of the coupling arrangement encloses together with a radial vector r lying in the coupling plane a horizontal angle $\varphi$,
   wherein the radial vector r runs from a center O of the mounting node that is disposed in the coupling plane to a point of intersection P, in which the fastening member axis intersects the coupling plane, and
   wherein the horizontal angle $\varphi$ is 0° to ±180° wherein the coupling arrangement comprises at least one coupling finger which is pivotally connected to the mounting node, said at least one coupling finger being pivotable between and including a space-saving rest position and a work position.

2. The connecting device according to claim 1, wherein the connecting device comprises at least one fastening member block which, in the installed state, is arranged on an upper side of the coupling arrangement, and has one or more fastening member bores which determine the position and direction of the fastening member axes.

3. The connecting device according to claim 1, wherein a plurality of the components and/or members of the connecting device which, in the installed state, are connected to one another, are all detachably connected to one another via at least one of a screw, clamp, bolt, splint or bayonet connections.

4. The connecting device according to claim 1, wherein the connecting device has a structure-borne sound insulating unit which is designed in such a way that, in the installed state, the structure-borne sound insulating transmission is insulated or attenuated from the wooden construction element via the connecting device to the lower support and/or to the upper support.

5. The connecting device according to claim 1, wherein the connecting device is designed in such a way that, in the installed state, at least part of the flow of forces is passed via at least one insulating element in each case which is designed for insulating or attenuating the structure-borne sound transmission.

6. The connecting device according to claim 1, wherein, in the installed state, the connecting device comprises at least one of the following insulating elements:
   a. an insulating element which is arranged between the upper side of the wooden construction element and the underside of the coupling arrangement;
   b. an insulating element which is arranged between the upper side of the coupling arrangement and an underside of the fastening member block;
   c. an insulating element which is arranged between the underside of the wooden construction element and the lower mounting body;
   d. an insulating element which is arranged between the mounting node and the lower support or between the lower support body and the lower support; and
   e. an insulating element which is arranged between the mounting node and the upper support or between the upper support body and the upper support.

7. A connecting device for mounting a wooden construction element, on a support, the connecting device comprising:
   a. a mounting node which is designed for mounting the connecting device on the support; and
   b. a coupling arrangement which is connected to the mounting node and which, in an installed state, while projecting from the mounting node on an upper side of the wooden construction element, can be connected to the wooden construction element using fastening members which at least partially pass through the wooden construction element, the coupling arrangement comprising at least one coupling finger connected to and extending from the mounting node, and wherein
   the coupling arrangement is designed in such a way that it can be connected to the wooden construction element in each case along a fastening member axis by means of screw-shaped, pin-shaped or nail-shaped fastening members,
   the coupling arrangement has fastening member bores which determine the position and direction of the fastening member axes, wherein these fastening member bores are designed in such a way that, in the installed state,
   the fastening member axis encloses together with a normal vector n extending from the underside of the coupling arrangement one angle of inclination $\theta$ each, which is 0° to 80° and
   a direction vector s' of the projection of the fastening member axis on a coupling plane defined by the underside of the coupling arrangement encloses together with a radial vector r lying in the coupling plane a horizontal angle $\varphi$,
   wherein the radial vector r runs from a center O of the mounting node that is disposed in the coupling plane to a point of intersection P, in which the fastening member axis intersects the coupling plane, and
   wherein the horizontal angle $\varphi$ is 0° to ±180° and wherein the connecting device comprises at least one fastening member block which, in the installed state, is arranged on an upper side of the coupling arrangement, and has one or more fastening member bores which determine the position and direction of the fastening member axes, wherein
   the coupling finger is pivotally connected to the mounting node, said at least one coupling finger being pivotable between and including a space-saving rest position and a work position.

8. A wooden construction arrangement comprising:
   a. a support;
   b. a wooden construction element; and
   c. a connecting device mounted on the support, the connecting device comprising:
      i. a mounting node which is designed for mounting the connecting device on the support; and
      ii. a coupling arrangement which is connected to and projecting from the mounting node, the coupling arrangement being disposed on an upper side of the wooden construction element; and
   d. fastening members which attach the wooden construction element to the coupling arrangement on the upper side of the wooden construction element, the fastening members at least partially passing through the wooden construction element, and wherein
   the coupling arrangement is designed in such a way that it can be connected to the wooden construction element in each case along a fastening member axis by means of screw-shaped, pin-shaped or nail-shaped fastening members,
   the coupling arrangement has fastening member bores which determine the position and direction of the fastening member axes, wherein these fastening member bores are designed in such a way that, in the installed state,
   the fastening member axis encloses together with a normal vector n extending from the underside of the coupling arrangement one angle of inclination $\theta$ each, which is 0° to 80°, and
   a direction vector s' of the projection of the fastening member axis on a coupling plane defined by the underside of the coupling arrangement encloses together with a radial vector r lying in the coupling plane a horizontal angle $\varphi$,
   wherein the radial vector r runs from a center O of the mounting node that is disposed in the coupling plane to a point of intersection P, in which the fastening member axis intersects the coupling plane, and
   wherein the horizontal angle $\varphi$ is 0° to ±180°, and wherein the coupling arrangement comprises at least one coupling finger which is pivotally connected to the mounting node, said at least one coupling finger being pivotable between and including a space-saving rest position and a work position.

9. The wooden construction arrangement according to claim 8, wherein the coupling arrangement comprises at least one coupling finger disposed in a work position.

10. The wooden construction arrangement according to claim 8, wherein the connecting device comprises at least one fastening member block which is arranged on an upper side of the coupling arrangement, the fastening member block comprising one or more fastening member bores through which the fastening members pass, the bores determining the position and direction of the fastening member axes.

11. A structure comprising a wooden construction arrangement according to claim 8.

12. A connecting device for mounting a wooden construction element, on a support, the connecting device comprising:
   a. a mounting node which is designed for mounting the connecting device on the support; and
   b. a coupling arrangement which is connected to the mounting node and which, in an installed state, while projecting from the mounting node on an upper side of the wooden construction element, can be connected to the wooden construction element using fastening members which at least partially pass through the wooden construction element, and wherein
   the coupling arrangement is designed in such a way that it can be connected to the wooden construction element in each case along a fastening member axis by means of screw-shaped, pin-shaped or nail-shaped fastening members;
   the coupling arrangement has fastening member bores which determine the position and direction of the fastening member axes, wherein these fastening member bores are designed in such a way that, in the installed state;
   the fastening member axis encloses together with a normal vector n extending from the underside of the coupling arrangement one angle of inclination θ each, which is 0° to 80°; and
   a direction vector s' of the projection of the fastening member axis on a coupling plane defined by the underside of the coupling arrangement encloses together with a radial vector r lying in the coupling plane a horizontal angle φ,
   wherein the radial vector r runs from a center O of the mounting node that is disposed in the coupling plane to a point of intersection P, in which the fastening member axis intersects the coupling plane, and
   wherein the horizontal angle φ is 0° to ±180°, and wherein the mounting node comprises:
      a coupling node to which the coupling arrangement is connected in the installed state;
      a lower support body which, in the installed state, projects downwards and which, in the installed state, is connected to the coupling node and passes through the wooden construction element; and
      a lower mounting body which, in the installed state, is connected to the lower support body and is designed for mounting on the support.

13. The connecting device according to claim 12, wherein the coupling node, the lower support body and the lower mounting body are designed in such a way that the distance between the coupling node and the lower mounting body can be adjusted.

14. The connecting device according to claim 12, wherein the mounting node additionally comprises:
   a. an upper support body which, in the installed state, projects upwards and which, in the installed state, is connected to the coupling node; and
   b. an upper mounting body which, in the installed state, is connected to the upper support body and is designed for mounting a further support.

15. The connecting device according to claim 14, wherein the coupling node, the upper support body and the upper mounting body are designed in such a way that the distance between the coupling node and the upper support body can be adjusted.

16. The connecting device according to claim 12, wherein the connecting device comprises at least one fastening member block which, in the installed state, is arranged on an upper side of the coupling arrangement, and has one or more fastening member bores which determine the position and direction of the fastening member axes.

17. The connecting device according to claim 12, wherein a plurality of the components and/or members of the connecting device which, in the installed state, are connected to one another, are all detachably connected to one another via at least one of screw, clamp, bolt, splint or bayonet connections.

18. The connecting device according to claim 12, wherein the connecting device has a structure-borne sound insulating unit which is designed in such a way that, in the installed state, the structure-borne sound insulating transmission is insulated or attenuated from the wooden construction element via the connecting device to the lower support and/or to the upper support.

19. The connecting device according to claim 12, wherein the connecting device is designed in such a way that, in the installed state, at least part of the flow of forces is passed via at least one insulating element in each case which is designed for insulating or attenuating the structure-borne sound transmission.

20. The connecting device according to claim 12, wherein, in the installed state, the connecting device comprises at least one of the following insulating elements:
   a. an insulating element which is arranged between the upper side of the wooden construction element and the underside of the coupling arrangement;
   b. an insulating element which is arranged between the upper side of the coupling arrangement and an underside of the fastening member block;
   c. an insulating element which is arranged between the underside of the wooden construction element and the lower mounting body;
   d. an insulating element which is arranged between the mounting node and the lower support or between the lower support body and the lower support; and
   e. an insulating element which is arranged between the mounting node and the upper support or between the upper support body and the upper support.

21. A wooden construction arrangement comprising:
   a. a support;
   b. a wooden construction element; and
   c. a connecting device mounted on the support, the connecting device comprising:
      i. a mounting node which is designed for mounting the connecting device on the support; and
      ii. a coupling arrangement which is connected to and projecting from the mounting node, the coupling arrangement being disposed on an upper side of the wooden construction element; and
   d. fastening members which attach the wooden construction element to the coupling arrangement on the upper side of the wooden construction element, the fastening members at least partially passing through the wooden construction element, and wherein the coupling arrangement is designed in such a way that it can be connected to the wooden construction element in each case along a fastening member axis by means of screw-shaped, pin-shaped or nail-shaped fastening members;

the coupling arrangement has fastening member bores which determine the position and direction of the fastening member axes, wherein these fastening member bores are designed in such a way that, in the installed state;

the fastening member axis encloses together with a normal vector n extending from the underside of the coupling arrangement one angle of inclination θ each, which is 0θ to 80°; and a direction vector s' of the projection of the fastening member axis on a coupling plane defined by the underside of the coupling arrangement encloses together with a radial vector r lying in the coupling plane a horizontal angle φ, wherein the radial vector r runs from a center O of the mounting node that is disposed in the coupling plane to a point of intersection P, in which the fastening member axis intersects the coupling plane, and wherein the horizontal angle φ is 0° to ±180°, wherein the mounting node comprises:

a coupling node to which the coupling arrangement is connected in the installed state;

a lower support body which, in the installed state, projects downwards and which, in the installed state, is connected to the coupling node and passes through the wooden construction element; and a lower mounting body which, in the installed state, is connected to the lower support body and is designed for mounting on the support.

22. The wooden construction arrangement according to claim 21, wherein the coupling arrangement comprises at least one coupling finger disposed in a work position.

23. The wooden construction arrangement according to claim 21, wherein the connecting device comprises at least one fastening member block which is arranged on an upper side of the coupling arrangement, the fastening member block comprising one or more fastening member bores through which the fastening members pass, the bores determining the position and direction of the fastening member axes.

24. A structure comprising a wooden construction arrangement according to claim 21.

* * * * *